United States Patent [19]

Gellert

[11] 4,439,915

[45] Apr. 3, 1984

[54] HEATER INSTALLATION IN MOLDING MEMBERS

[76] Inventor: Jobst U. Gellert, 7A Prince St., Glen Williams, Canada

[21] Appl. No.: 369,193

[22] Filed: Apr. 16, 1982

[30] Foreign Application Priority Data

Mar. 31, 1982 [CA] Canada ................................. 400058

[51] Int. Cl.³ ............................................. H05B 3/06
[52] U.S. Cl. .................................. 29/611; 29/527.5; 29/527.6; 228/221; 228/245
[58] Field of Search .................... 29/611, 527.5, 527.6; 425/548, 549; 228/221, 245, 219, 220; 164/61, 80, 108

[56] References Cited

U.S. PATENT DOCUMENTS

| 1,754,716 | 4/1930 | Holst et al. | 164/108 |
| 2,409,800 | 5/1949 | Vogel | 74/501.5 R |
| 2,469,801 | 5/1949 | Vogel et al. | 338/240 |
| 2,987,815 | 6/1961 | Zeller | 228/220 |
| 3,189,948 | 6/1965 | Whitney | 425/548 |
| 3,383,493 | 5/1968 | Gellert | 219/200 |
| 3,846,903 | 11/1974 | Rupert et al. | 228/221 |
| 3,862,489 | 1/1975 | Weisinger | 29/423 |
| 3,941,299 | 3/1976 | Godfrey | 228/245 |

*Primary Examiner*—Howard N. Goldberg
*Assistant Examiner*—P. W. Echols
*Attorney, Agent, or Firm*—Riches, McKenzie & Herbert

[57] ABSTRACT

This invention relates to an improved method of installing an elongated heater such as a cartridge heater in a molding member such as an injection molding manifold member. First, a bore is drilled into an elongated portion of the manifold member to extend generally parallel to the hot runner passage extending through it and a filler duct is drilled from the top to intersect the bore along its length. The cartridge heater is then inserted into the bore and a filler tube with a base is set on the top in alignment with the filler duct. A brazing paste is then applied around the base of the filler tube and around the terminal portions of the cartridge heater extending from the bore. The manifold member is then heated in a vacuum furnace which brazes the filler tube in position and seals the outer end of the duct against leakage. A slug of copper is then inserted into the filler tube and the manifold member is again heated in the vacuum furnace sufficiently to cast the conductive copper to fill the space around the cartridge heater. The filler tube is then machined off to produce the finished manifold member. The copper fuses to the outer casing of the cartridge heater and the bore and together with the elimination of the insulative air space around the cartridge heater substantially improves heat flow and reduces the formation of hot spots which cause the heating element to burn out. In another embodiment, a tubular heater having two terminal portions is installed in a heater plate of a thermosetting mold with the terminal portions extending at opposite ends of the heater plate.

2 Claims, 6 Drawing Figures

HEATER INSTALLATION IN MOLDING MEMBERS

BACKGROUND OF THE INVENTION

This invention relates to an improved method of installing an elongated heater such as a cartridge heater in a molding member such as an injection molding manifold member.

As is well known in the injection molding art, uniform and accurate provision and control of melt temperature is becoming more and more important as improved systems and techniques permit and, in fact, demand the molding of increasingly difficult materials. It is, of course, well known to heat manifold members using elongated cartridge heaters of the type disclosed in U.S. Pat. No. 2,831,951 which issued Apr. 22, 1958 to Watlow Electric Manufacturing Company. These cartridge heaters are inserted into bores in the manifold members to extend along the hot runner passage extending through the manifold member to maintain the melt at a constant uniform temperature. However, these systems suffer from the disadvantage that there necessarily are small air spaces and/or layers of oxide left between the outside of the cartridge heaters and the bores in the manifold member into which they are inserted which has an insulative effect and substantially reduces the effectiveness of the heaters. Furthermore, the dimension of the air space or oxide layer is not uniform along each heater with the result that heat is not applied evenly along the hot runner passage, nor is it transferred evenly away from the electric heating element in the heater. This results in the formation of hot spots along the heating element which all too frequently causes it to burn out, necessitating a costly shut down of the system to replace it.

The properties of some of the new engineering materials with operating melt temperatures in the 900° F. range require that manifold members have increased loading capacity ratings. A recent attempt to overcome the problem has been to insert a tapered sleeve around the cartridge heater in a tapered hole. While this has reduced the size of the insulative air space, it has not eliminated it and, in fact, results in there being two air spaces, albeit they are smaller in size. In an alternative solution to this problem, the applicant provides a system with a tubular heating element cast into channels in the surface of the manifold member as disclosed in Canadian patent application Ser. No. 393,671 filed Jan. 6, 1982. Similar advantages arise in providing improved heat transfer from the tubular heaters arranged in a heater plate of a thermosetting mold.

SUMMARY OF THE INVENTION

Accordingly, it is an object of the present invention to at least partially overcome the disadvantages of the prior art by providing an improved method of installing an elongated heater in a molding member which improves bonding and substantially reduces or eliminates the insulative air space and/or layer of insulating oxide around the heater.

To this end, in one of its aspects, the invention provides a method of integrally installing an elongated electric heater in a molding member, the heater having a generally uniform cross section with a terminal portion at at least one end, the molding member having at least one end and a top, comprising the steps of drilling a longitudinal bore in the molding member, the bore being slightly larger in diameter than the heater, drilling a filler duct in the molding member to extend from an upper end at said top of the molding member to intersect the elongated bore along its length, inserting the heater into a position in the elongated bore with a terminal portion extending at said at least one end, a small air space being formed around the heater in the bore, sealing the bore around the heater at said at least one end of the molding member against leakage from the air space, and vacuum casting a highly conductive material through the duct to fill the space around the heater, to provide an integral structure with the molding member.

In another of its aspects, the invention further provides a method of integrally installing an elongated electric cartridge heater in an elongated portion of an injection molding manifold member, the cartridge heater having a generally uniform cross section with a terminal portion at one end, the elongated portion of the manifold member having an end and a top and a hot runner passage extending generally longitudinally therethrough, comprising the steps of drilling a longitudinal bore in the elongated portion of the manifold member to extend from said end generally parallel to the hot runner passage, the bore being slightly larger in diameter than the cartridge heater, drilling a filler duct in the elongated portion of the manifold member to extend from an upper end at said top of the elongated portion to intersect the elongated bore along its length, inserting the cartridge heater into a position in the elongated bore with the terminal portion extending at said end, a small air space being formed around the cartridge heater in the bore, sealing the bore around the cartridge heater at said end of the elongated portion against leakage from the air space, and vacuum casting a highly conductive material through the duct to fill the space around the cartridge heater, to provide an integral structure with the manifold member.

Further objects and advantages of the invention will appear from the following description, taken together with the accompanying drawings.

BRIEF DESCRIPTION OF THE DRAWINGS

FIG. 1 is an isometric view of a portion of a manifold member in which bores have been drilled to receive cartridge heaters;

FIG. 2 shows the cartridge heaters inserted into the bores with filler tubes located on the top of the manifold member;

FIG. 3 shows the filler tubes fixed in position with conductive material inserted into them;

FIG. 4 shows a batch of manifold members ready for insertion into a vacuum furnace;

FIG. 5 shows the portion of the manifold member with the cartridge heaters completely installed.

DESCRIPTION OF THE PREFERRED EMBODIMENT

Figure 1:
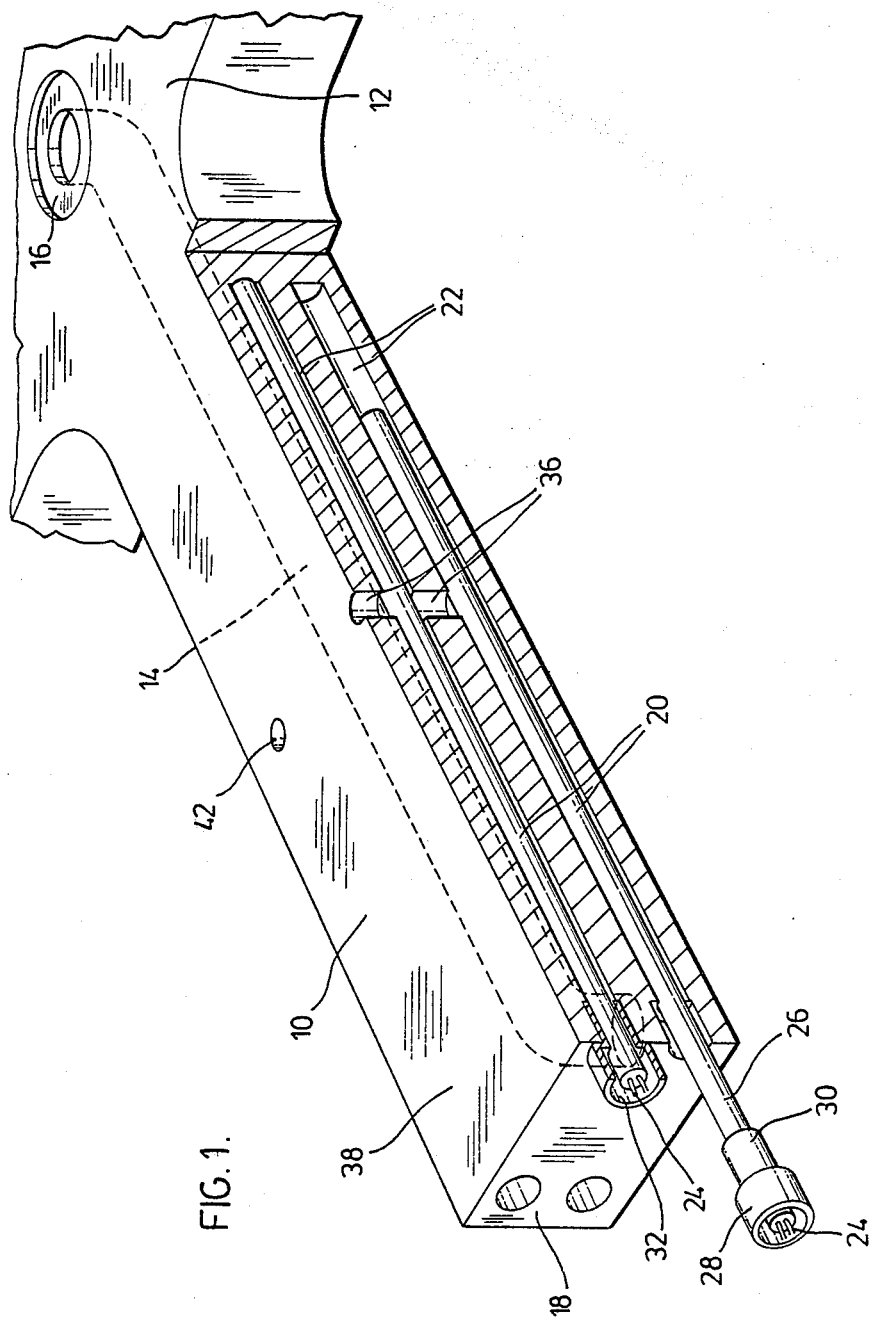
FIGS. 1-5 illustrate a sequence of steps in installing heater cartridges in an injection molding manifold member according to a preferred embodiment of the invention.

Reference is first made to FIG. 1 which shows one elongated portion 10 of a manifold member 12 for an injection molding system. Each elongated portion 10 has a hot runner passage 14 which branches out from a recessed inlet 16. The recessed inlet 16 is centrally located in the manifold member 12 and receives the heated sprue member which is in contact with the nozzle of a molding machine (not shown). Pressurized molten melt from the molding machine flows outward through the hot runner passages 14 in the heated manifold member 12 to the remainder of the system (not shown) leading to the cavities. The hot runner passage 14 is centrally located in the elongated portion 10 and extends generally longitudinally out from the recessed inlet 16 until it bends near the outer end 18 of the elongated portion 10.

The manifold member 12 is formed of a suitable strong conductive material such as H13 hot-work tool steel and is heated by a number of electric cartridge heaters 20 which are installed in elongated bores 22 in each elongated portion 10. As may be seen, in the arrangement shown in FIG. 1 each elongated portion 10 has four cartridge heaters which extend generally parallel to the longitudinal portion of the hot runner passage and are evenly spaced around it to maintain the melt at a uniform temperature as it flows through the manifold member. As mentioned above, the cartridge heaters 20 may be of the type disclosed in U.S. Pat. No. 2,831,951, with a coiled electric heating element terminating in the cold terminal lead wires 24 extending in a heat transfer material in a metal outer casing 20. The heat transfer material is normally magnesium oxide powder and the casing 26 is usually swaged in a conventional manner to compress the magnesium oxide powder to improve heat transfer. The cartridge heaters 20 each have a terminal portion 28 formed by a flanged sleeve 30 which forms a recess 32 to protect the cold lead wires 24 which project into it.

As mentioned above, the figures illustrate a sequence of steps of the method according to one embodiment of the invention. FIG. 1 shows the elongated portion 10 of the manifold member 12 with the longitudinal bores 22 which have been drilled in it from the outer end 18. Filler ducts 36 are then drilled from the top 38 of the elongated portion 10 of the manifold member 12 to intersect the bores 22 along their lengths (in this case each filler duct intersects two bores). The cartridge heaters 20 are then inserted into the longitudinal bores 22 which are drilled slightly larger in diameter than the cartridge heaters 20 and are counterbored to receive the flanged sleeves 30. After the cartridge heaters 20 have all been inserted into place in the bores 22, a filler tube 40 is located on the top 38 of the elongated portion 10 around the upper end 42 of each of the ducts. A nickel brazing paste is then applied around the base 44 of each of the filler tubes 40 and around each of the flanged sleeves 30 at the terminal portions 28 of the cartridge heaters 20.

Figure 2:
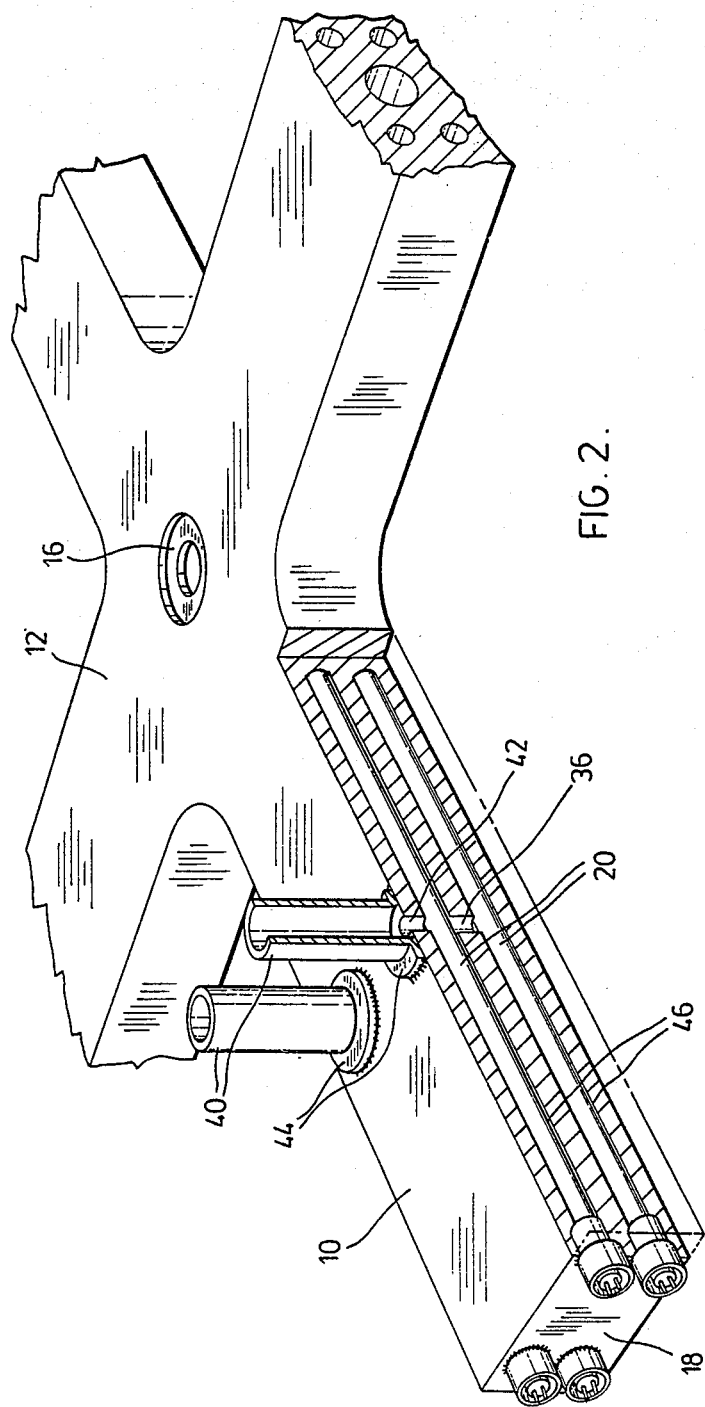
Figure 3:
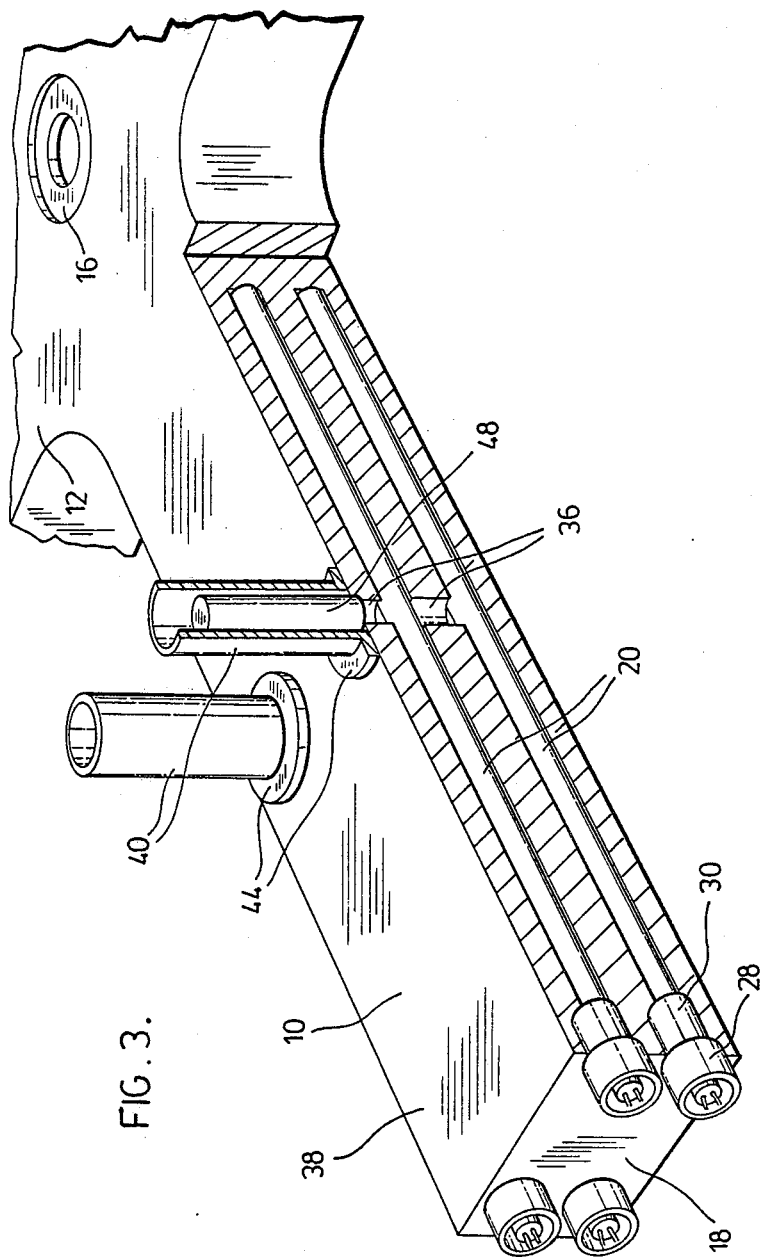
Figure 4:
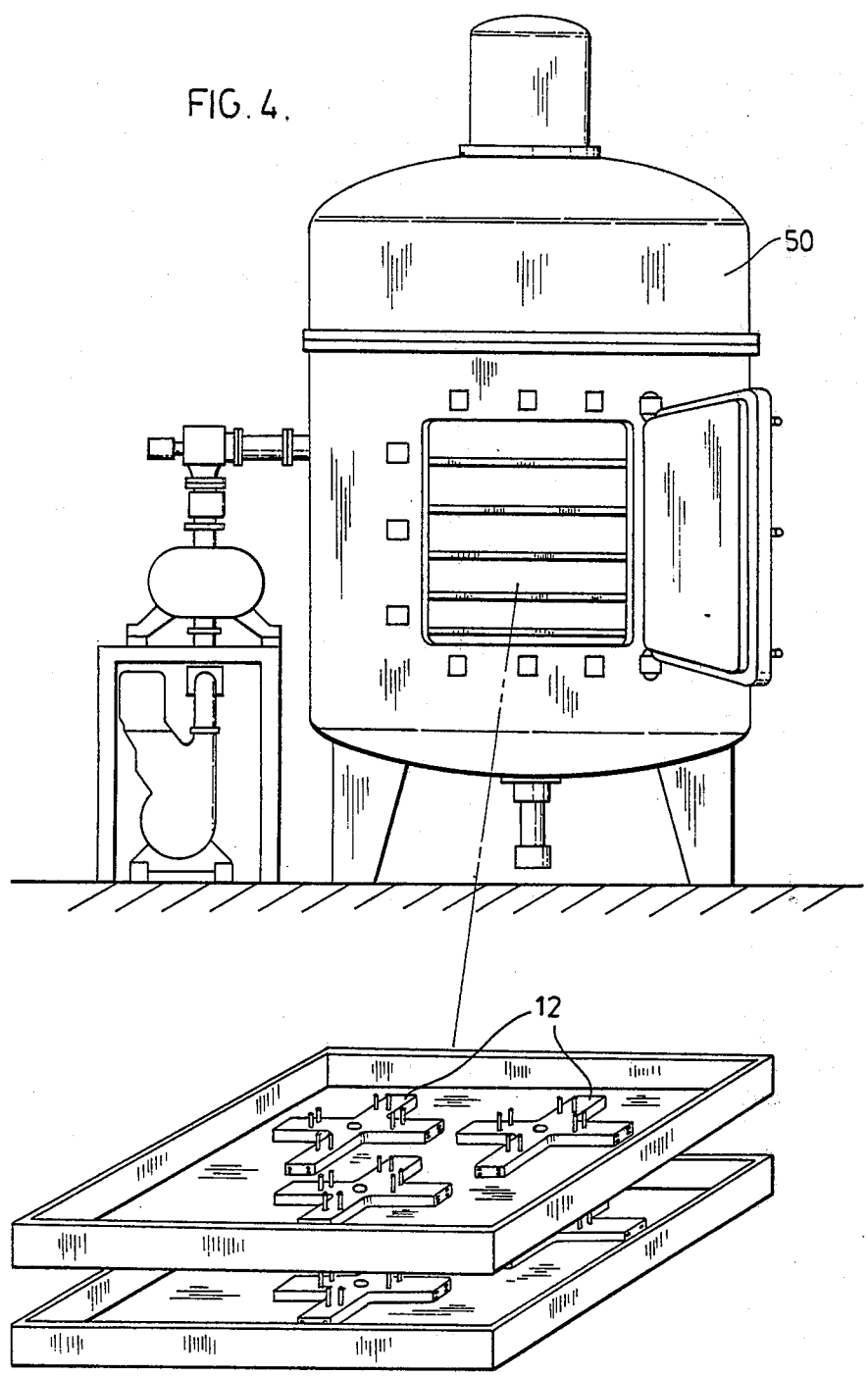

After assembly as shown in FIG. 2, batches of manifold members 12 with the filler tubes 40 in position are then heated in a vacuum furnace. This causes the nickel brazing compound which melts around 2180° F. to run all around the joints and braze them to fix the filler tubes 40 in position and seal them and the air spaces 46 formed between the cartridge heaters 20 and the bores 22 against leakage. When they are removed from the vacuum furnace, a slug 48 of a predetermined quantity of highly conductive material such as copper is inserted into each filler tube 40, as shown in FIG. 3. The assemblies are then again inserted into the vacuum furnace 50 in an upright position, as shown in FIG. 4. They are heated until each copper slug 48 melts and the molten copper flows down through the filler duct 36 to fill the space 46 between the cartridge heater 20 and the duct 22. As will be appreciated, the vacuum furnace removes the air from this space 46 before the copper slug 48 melts which results in the copper flowing entirely around the narrow space and fusing to both the outer casing 26 of the cartridge heater 20 and the bore 22, providing a bond therebetween which very substantially improves the heat transfer from the heater. The assemblies are heated in the vacuum furnace 50 for a sufficient period of time and to a temperature which will completely fill the spaces 46, but not melt the nickel brazing. When copper is the highly conductive bonding material, it would be heated to about 1950° F. In addition to bonding or fusing the outer casing 26 of the cartridge heater 20 to the bore, this eliminates or at least substantially reduces the formation of any insulative air gaps which otherwise tend to create "hot spots" along the length of the cartridge heater 20 eventually causing it to burn out due to excessive temperatures. This improved uniform flow of heat from the cartridge heaters 20 to the manifold member 12 means that the heating element 24 does not have to be as hot to produce the same effect and that the melt does not have to be overheated in some spots to provide sufficient heat in others.

Figure 5:
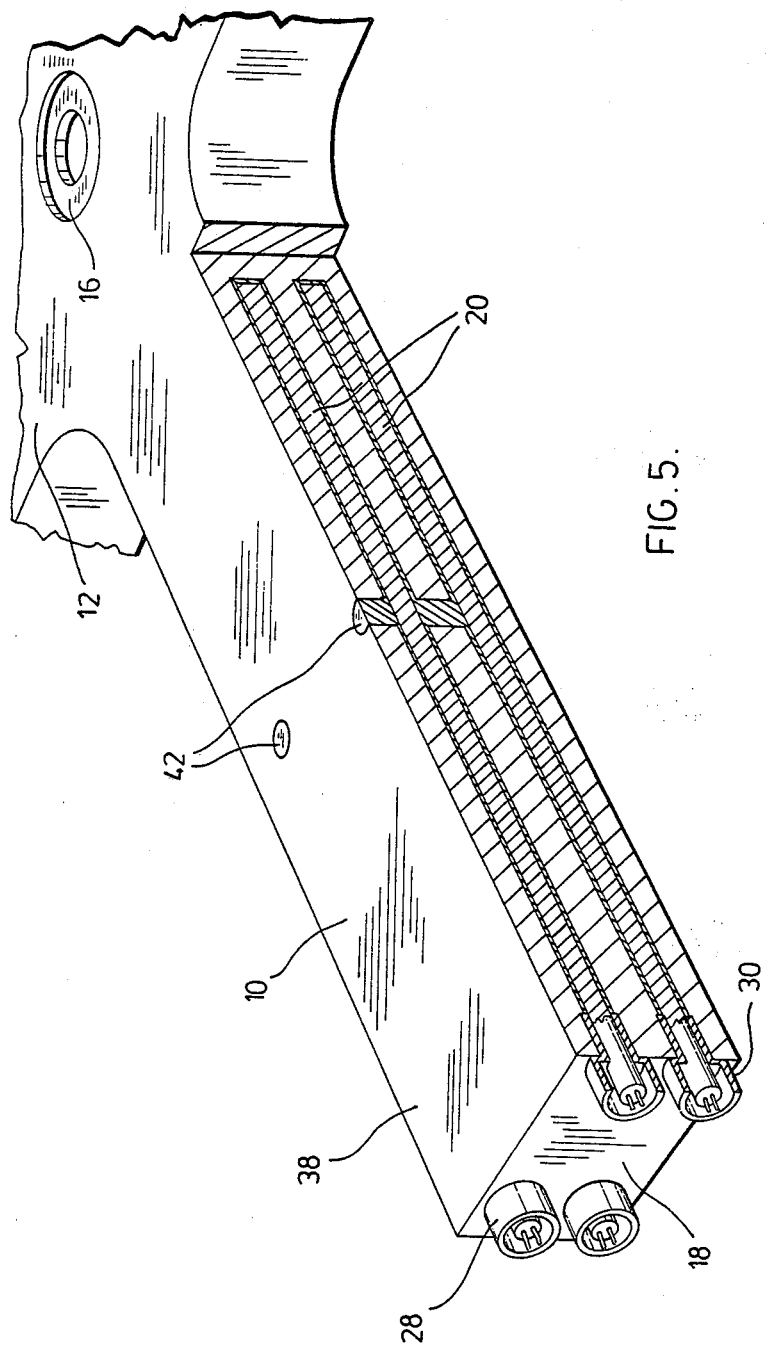

After the copper has melted and been cast into the spaces 46, the manifold members 12 are removed from the vacuum furnace and allowed to cool. The filler tubes 40 are then machined off to produce the finished product shown in FIG. 5.

Figure 6:
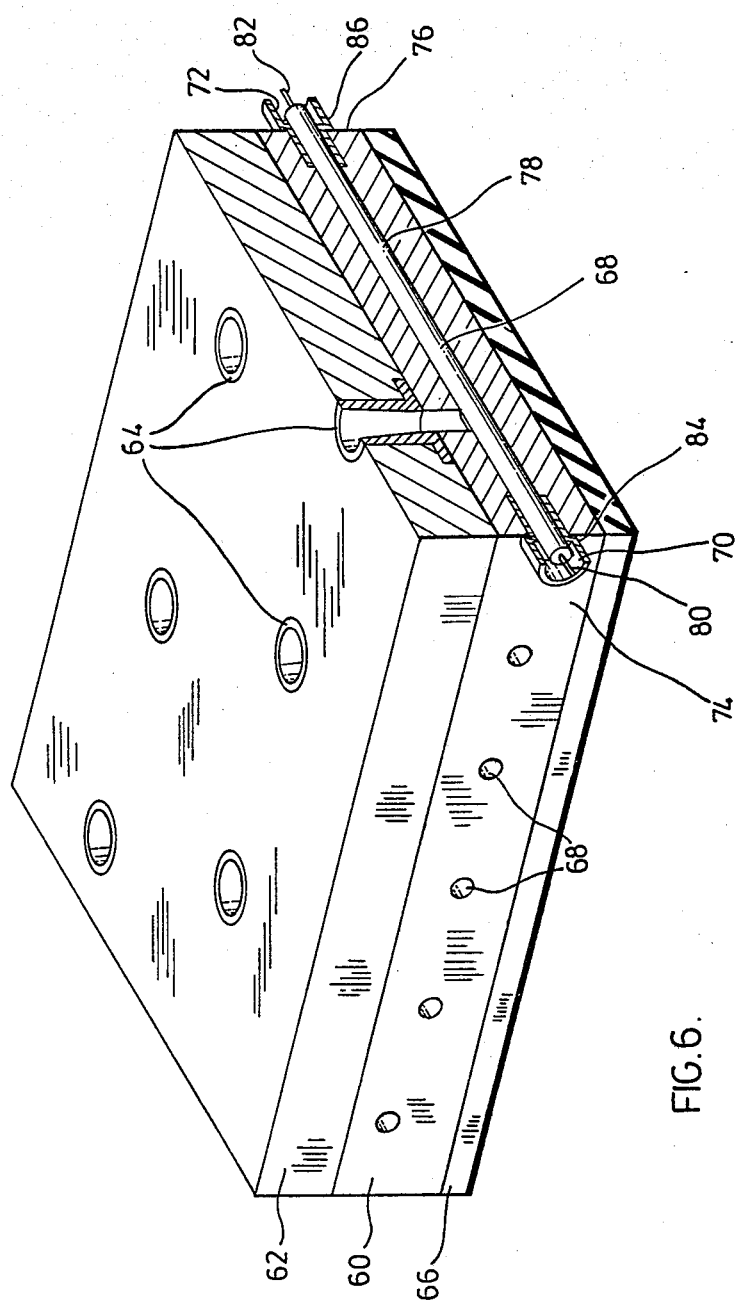
FIG. 6 is a cut-away isometric view showing the installation of tubular heaters in a heater plate of a thermosetting mold according to another embodiment of the invention.

This method may also be used to install a tubular heater in a heater plate of a thermosetting mold and such an installation is illustrated in FIG. 6. Referring to FIG. 6, a conductive heater plate 60 is located between a cavity retainer plate 62 containing the mold inserts 64 and a ceramic insulation plate 66. The heater plate 60 has a number of tubular heaters 68 installed in it in a parallel configuration by the present method. The tubular heaters 68 each have a terminal portion 70,72 at each end 74,76 of the heater plate 60. The tubular heaters normally have a single resistance wire which extends through an insulating material such as magnesium oxide powder in a metal outer casing 78 from cold terminal leads 80,82 at each end. As may be seen, the terminal portions 70,72 are each formed by flanged sleeves 84,86 which provide recesses to protect the cold terminal leads 80,82. The installation of the tubular heaters 68 in the heater plate 60 is carried out essentially the same as that described above in regard to the cartridge heaters 20 and the description need not be repeated in detail. One difference, of course, is that one of the flanged sleeves 84,86 must be installed after the heater 68 has been inserted into a hole drilled through the heater plate 60. After the ends have been sealed by brazing in a vacuum furnace, filler tubes are located around filler ducts drilled in the heater plate 60 and copper is cast around the heater 68 as described above.

Although the description of this invention has been given with regard to a particular embodiment of the method of installation, it is not to be construed in a limiting sense. Many variations and modifications will now occur to those skilled in the art. For instance, it is apparent that a different number of heaters may be installed in each molding member and, while the preferred embodiment shows filling two bores using one filler duct 36, this ratio will depend upon the desired configuration and location of both the heaters and the filler ducts. For a definition of the invention, reference is made to the attached claims.

What I claim is:

1. A method of integrally installing an elongated electric cartridge heater in a steel injection molding member, the heater having a generally uniform cross section with a terminal portion at at least one end, the molding member having at least one end and a top, comprising the steps of:
    (a) drilling a longitudinal bore in the molding member, the bore being slightly larger in diameter than the cartridge heater;
    (b) drilling a filler duct in the molding member to extend from an upper end at said top of the molding member to intersect the elongated bore along its length;
    (c) inserting the cartridge heater into a position in the elongated bore with a terminal portion extending at said at least one end, a small air space being formed around the heater in the bore;
    (d) locating an open ended filler tube on the top of the molding member around the upper end of the filler duct, applying brazing material around the joint between it and the molding member as well as around the terminal portion of the cartridge heater at said at least one end and brazing the assembly in a vacuum furnace to fix the filler tube in position on the molding member and seal the bore around the heater;
    (e) inserting a predetermined quantity of highly conductive material into the filler tube fixed to the molding member;
    (f) vacuum casting the assembly in a vacuum furnace to melt the highly conductive material which flows down through the duct to fill the space around the heater, to provide an integral structure with the molding member; and
    (g) machining off the filler tube after removal from the vacuum furnace.

2. A method as claimed in claim 1 wherein the highly conductive material is copper.

* * * * *